United States Patent
Iyengar

(10) Patent No.: US 10,394,481 B2
(45) Date of Patent: Aug. 27, 2019

(54) REDUCING APPLICATION INPUT/OUTPUT OPERATIONS FROM A SERVER HAVING DATA STORED ON DE-DUPED STORAGE

(71) Applicant: International Business Machines Corporation, Armonk, NY (US)

(72) Inventor: Ranganath G. Iyengar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 14/086,519

(22) Filed: Nov. 21, 2013

(65) Prior Publication Data
US 2015/0142862 A1 May 21, 2015

(51) Int. Cl.
*G06F 16/00* (2019.01)
*G06F 3/06* (2006.01)
*G06F 16/174* (2019.01)

(52) U.S. Cl.
CPC ............ *G06F 3/0641* (2013.01); *G06F 3/067* (2013.01); *G06F 3/0619* (2013.01); *G06F 16/1752* (2019.01)

(58) Field of Classification Search
CPC ............... G06F 3/0641; G06F 11/1453; G06F 17/30156; G06F 16/1752; G06F 3/067; G06F 3/0619
See application file for complete search history.

(56) References Cited

U.S. PATENT DOCUMENTS

| | | | |
|---|---|---|---|
| 7,065,619 B1 | 6/2006 | Zhu et al. | |
| 7,908,436 B1* | 3/2011 | Srinivasan | G06F 3/0622 711/114 |
| 7,962,706 B2* | 6/2011 | Davis | G06F 3/0611 711/114 |
| 8,204,867 B2* | 6/2012 | Benhase | G06F 3/0608 707/692 |
| 8,209,506 B2* | 6/2012 | Yueh | G06F 3/0608 707/664 |
| 8,290,915 B2 | 10/2012 | Anglin | |
| 9,256,378 B2* | 2/2016 | Zheng | G06F 3/0641 |
| 2006/0059207 A1 | 3/2006 | Hirsch et al. | |
| 2009/0063528 A1* | 3/2009 | Yueh | G06F 3/0641 |
| 2010/0211616 A1* | 8/2010 | Khandelwal | G06F 12/0868 707/812 |
| 2011/0271010 A1 | 11/2011 | Kenchammana et al. | |

(Continued)

OTHER PUBLICATIONS

Zhu, B. et al, "Avoiding the Disk Bottleneck in the Data Domain Deduplication File System", Proceedings of the 6th USENIX Conference on File and Storage Technologies, San Jose, CA, Feb. 2008.

(Continued)

*Primary Examiner* — Alexander Khong
(74) *Attorney, Agent, or Firm* — Scully, Scott, Murphy & Presser, P.C.; Scott S. Dobson

(57) ABSTRACT

The present disclosure relates generally to the field of reducing application input/output operations from a server having data stored on (e.g., remotely stored on) de-duped storage. In various embodiments, reducing application input/output operations from a server having data stored on (e.g., remotely stored on) de-duped storage may be implemented in the form of systems, methods and/or algorithms.

21 Claims, 11 Drawing Sheets

(56) References Cited

U.S. PATENT DOCUMENTS

2012/0131025 A1 5/2012 Cheung et al.
2013/0318052 A1* 11/2013 Amit .................. G06F 16/1748
　　　　　　　　　　　　　　　　　　　　707/692

OTHER PUBLICATIONS

Bach, "The Design of the UNIX Operating System", www.cs.ucsb.edu/~rich/class/cs170/notes/FileSystem/index.html, 1986, ISBN-13: 978-0132017992; ISBN-10: 0132017997, 7 pages.

* cited by examiner

US 10,394,481 B2

REDUCING APPLICATION INPUT/OUTPUT OPERATIONS FROM A SERVER HAVING DATA STORED ON DE-DUPED STORAGE

BACKGROUND

The diagram of FIG. 1 shows a conventional input/output ("IO") operation from an application to a block device (e.g., storage such as a disk). This example shows files organized within a file system 101 (which could be, e.g., on a server, a storage node or a "host"). Each file (see File A and File B) has granular entities of data called blocks—which are addressed through logical block addresses. As can be seen, File A has 3 blocks of data which can be accessed with logical block address ("LBA") of 100, 105 and 200. A block device 103 (e.g., disk or disk subsystem) is operatively connected to the file system 101 and receives the block address requests from the file system 101. The block device 103 responds to the file system 101 with the appropriate block of requested data (although a file system has been given as an example, the same work flow may apply to one or more databases or to any other block access system).

In one specific example, the block device 103 is operatively connected to the file system 101 through Storage Area Network (SAN) or Direct attached storage (DAS) (a SAN storage system hosts multiple file systems through multiple nodes and thus has information of block data for a given application).

Referring now to FIG. 2, this diagram shows a conventional IO operation similar to FIG. 1. In this FIG. 2, however, the IO operation is from an application to a de-duped block device (e.g., storage such as a disk). In various examples, a conventional de-dupe algorithm may be implemented as inline processing and/or as post processing. Further, such a conventional de-dupe algorithm may be implemented in one or more of the following locations: (1) a gateway appliance in a backup path (e.g., IBM's Protectier, EMC's Datadomain products, etc.); and/or (2) a primary storage path on a Network Attached storage (NAS)/Unified storage device (the storage device that implements both NAS and block storage access method in a single device).

Still referring to FIG. 2, files are organized within a file system 201 (which could be, e.g., on a server, a storage node or a "host"). In this example, two files—File A and File B are stored. The de-dupe algorithm has found that 2 blocks of data in File A are similar to 2 blocks of data in File B. That is, Block 400=Block 200 and Block 405=Block 105.

As seen, from the point of view of storage capacity requirements, the de-duping has reduced the capacity needs from 5 blocks to 3 blocks. However, even though the storage capacity requirements have been reduced, the file IO operations still remain at 5 IO requests (the example discussed above is a very simplified view of de-dupe, the actual implementation of de-dupe might be more rigorous in identifying, sizing and placing of block data).

SUMMARY

The present disclosure relates generally to the field of reducing application input/output operations from a server having data stored on (e.g., remotely stored on) de-duped storage.

In one embodiment, a method implemented in a computer for reducing input/output operations between the computer and a storage device accessible by the computer is provided, the method comprising: tracking, by the computer, a plurality of data blocks read from the storage device into a memory of the computer, wherein each of the data blocks has an associated block number; determining, by the computer, for each of the plurality of data blocks read from the storage device into the memory of the computer, the associated block number; querying, by the computer, a de-dupe engine associated with the storage device, wherein the querying comprises requesting from the de-dupe engine a list of de-duped data blocks, wherein each of the listed de-duped data blocks has an associated block number; receiving, by the computer, from the de-dupe engine the list of de-duped data blocks, wherein the list comprises a list of block numbers; arranging, by the computer, the memory of the computer to have one memory area hold a single given one of the data blocks read from the storage device, the given one of the data blocks having a given block number; and arranging, by the computer, the memory of the computer to have the one memory area also point to one or more block numbers, other than the given block number, that have data blocks found to be identical to the given data block based upon the list of de-duped data blocks.

In another embodiment, a computer-implemented system for reducing input/output operations between the computer and a storage device accessible by the computer is provided, the system comprising: a tracking element configured to track a plurality of data blocks read from the storage device into a memory of the computer, wherein each of the data blocks has an associated block number; a determining element configured to determine, for each of the plurality of data blocks read from the storage device into the memory of the computer, the associated block number; a querying element configured to query a de-dupe engine associated with the storage device, wherein the querying comprises requesting from the de-dupe engine a list of de-duped data blocks, wherein each of the listed de-duped data blocks has an associated block number; a receiving element configured to receive from the de-dupe engine the list of de-duped data blocks, wherein the list comprises a list of block numbers; a first arranging element configured to arrange the memory of the computer to have one memory area hold a single given one of the data blocks read from the storage device, the given one of the data blocks having a given block number; and a second arranging element configured to arrange the memory of the computer to have the one memory area also point to one or more block numbers, other than the given block number, that have data blocks found to be similar to the given data block based upon the list of de-duped data blocks.

In another embodiment, a computer readable storage medium, tangibly embodying a program of instructions executable by the computer for reducing input/output operations between the computer and a storage device accessible by the computer is provided, the program of instructions, when executing, performing the following steps: tracking a plurality of data blocks read from the storage device into a memory of the computer, wherein each of the data blocks has an associated block number; determining, for each of the plurality of data blocks read from the storage device into the memory of the computer, the associated block number; querying a de-dupe engine associated with the storage device, wherein the querying comprises requesting from the de-dupe engine a list of de-duped data blocks, wherein each of the listed de-duped data blocks has an associated block number; receiving from the de-dupe engine the list of de-duped data blocks, wherein the list comprises a list of block numbers; arranging the memory of the computer to have one memory area hold a single given one of the data blocks read from the storage device, the given one of the data blocks having a given block number; and arranging the memory of the computer to have the one memory area also point to one or more block numbers, other than the given block number, that have data blocks found to be similar to the given data block based upon the list of de-duped data blocks.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

As described herein, reducing application input/output operations from a server having data stored on (e.g., remotely stored on) de-duped storage may be implemented in the form of systems, methods and/or algorithms.

For the purposes of describing and claiming the present invention the term "de-dupe query engine" is intended to refer to software, hardware or a combination thereof that performs the functions of: 1. Receives an input (query) from an external system with a data block number; 2. Uses the information of the dedupe algorithm, data structure, data base or any software construct specific implementation of the de-dupe technology and vendor to search all the block numbers that are similar to the received block numbers received from the input query and then responds to the query with the list of similar block numbers.

For the purposes of describing and claiming the present invention each of the terms "virtual machine" (VM), "virtual computer" and "virtual server" is intended to refer to a software based, fictive computer. Such virtual devices may be based on specifications of a hypothetical computer or emulate the computer architecture and functions of a real world computer.

Figure 1:
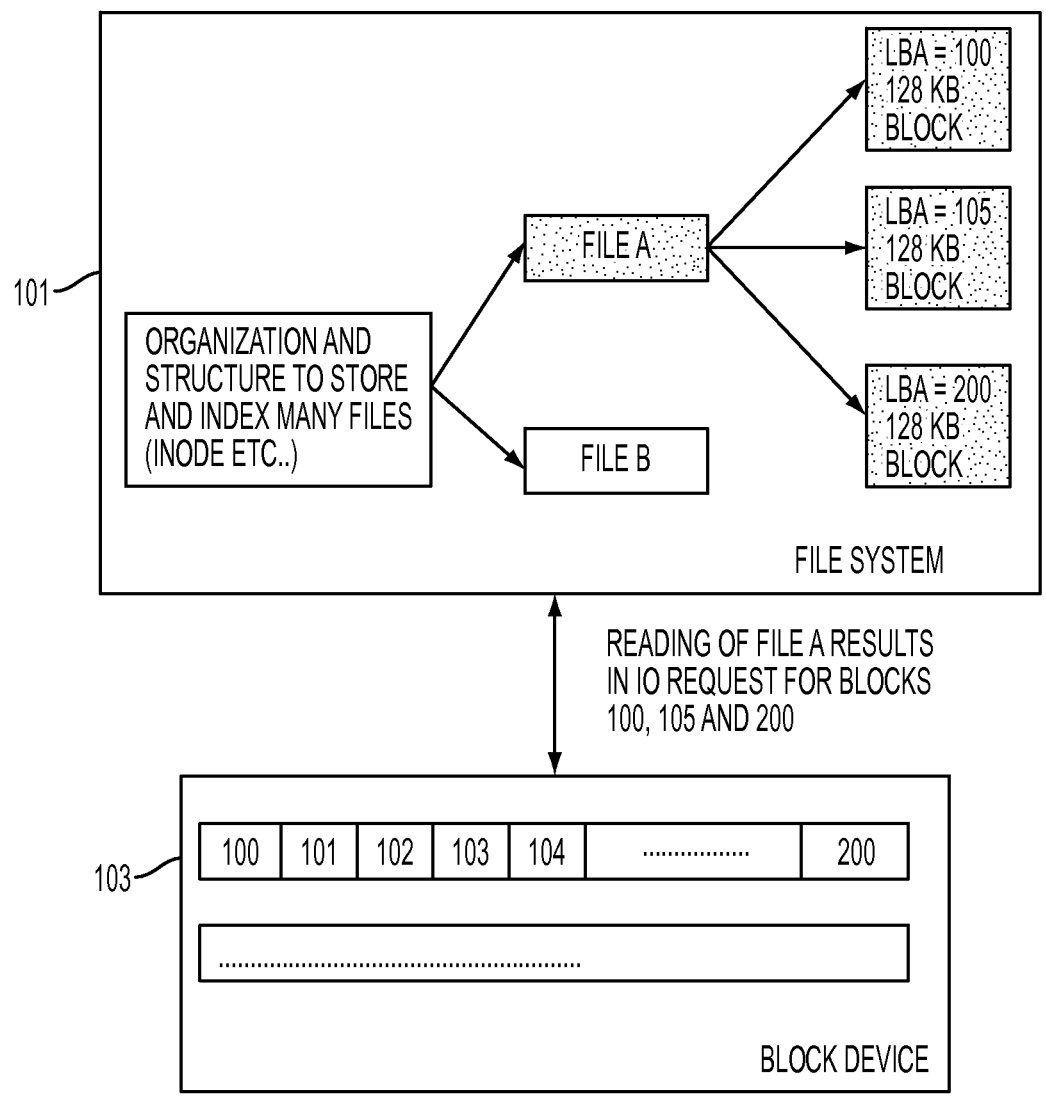
FIG. 1 depicts a block diagram of an overview of a conventional 10 path (the diagram in FIG. 1 only indicates a logical construct of block device and file system; the actual implementation could have file system 101 and block device 103 residing on the same physical computer, separated on different physical computers, or any other choices of deployment).
Figure 2:
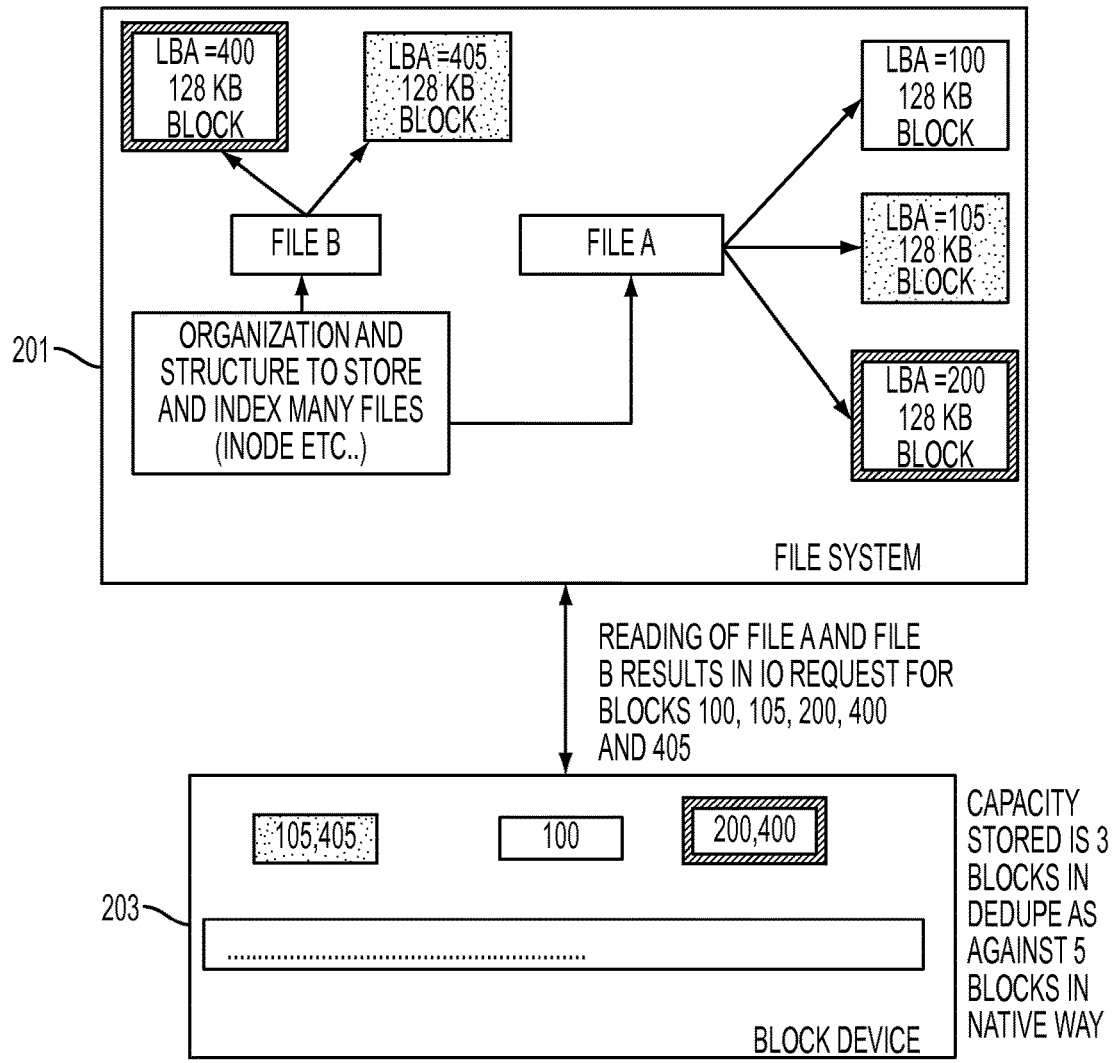
FIG. 2 depicts a block diagram of a conventional 10 path in a de-duped environment (the diagram in FIG. 21 only indicates a logical construct of block device and file system; the actual implementation could have file system 201 and block device 203 residing on the same physical computer, separated on different physical computers, or any other choices of deployment).
Figure 3:
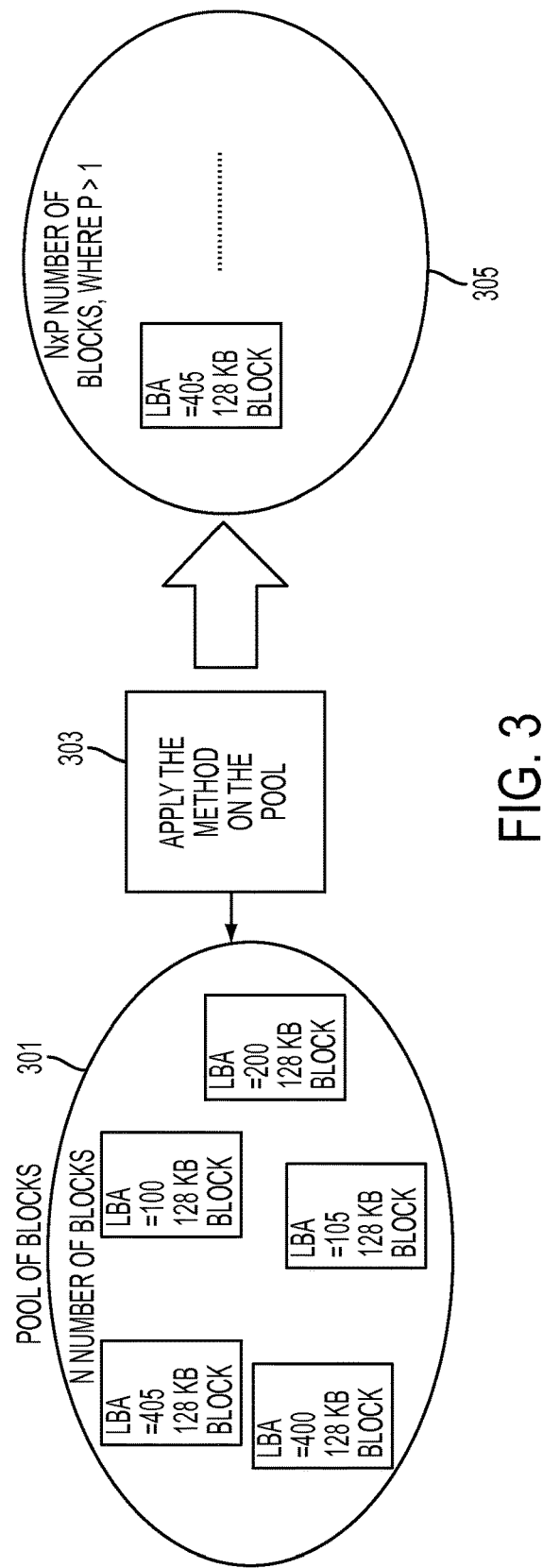
FIG. 3 depicts a block diagram of an implementation according to an embodiment of the present invention.

Referring now to FIG. 3, an example implementation according to an embodiment will be described. In this example implementation, a pool 301 of blocks of data in the memory is provided. The file system arranges these blocks of data in separate data structures based on, for example, requests by application(s), algorithm(s) to read ahead and/or or some other mechanism(s). to ensure that maximum input/output requests are served from the memory of the system rather than going to the disk to read the data. The specifics of how the blocks are arranged, data structures etc., are dependent on, for example, the system, software operating system and/or the vendor.

In any case, it is seen that after a method 303 of the type described herein is applied to pool 301, the resulting pool 305 has an increased number of blocks available in the memory of the server without the need to read from disk by having references of the existing blocks of data to other similar blocks of data. An example shown in FIG. 3, each of blocks of data (100, 105, 200,400 and 405) in pool 301 have the data of size 4 kilo byte or more dependent on the file system type. The block number is just an index to refer to the data. In the example shown, the method 303 is applied only for block number 405. The method finds out from the de-dupe query engine (described herein) that many other block numbers are similar to 405 and results in storing indexes of all the other block numbers corresponding to 405—thereby increasing the number of blocks of data in the memory. Thus, when the host or file system has to read data blocks that are similar to 405 it just reads block number 405 in memory rather than trying to do an IO to the disk system. In this description, block number 405 in the above example would be the primary block number since the data corresponding to 405 is in memory of the file system. Although the example is shown for block number 405 only in totality, if "N" is the number of blocks of data in memory and "P" is the number of new block numbers referring to the existing N blocks, then the resultant pool 305 will have N times P blocks of data with the very small amount of additional memory being consumed.

Figure 4:
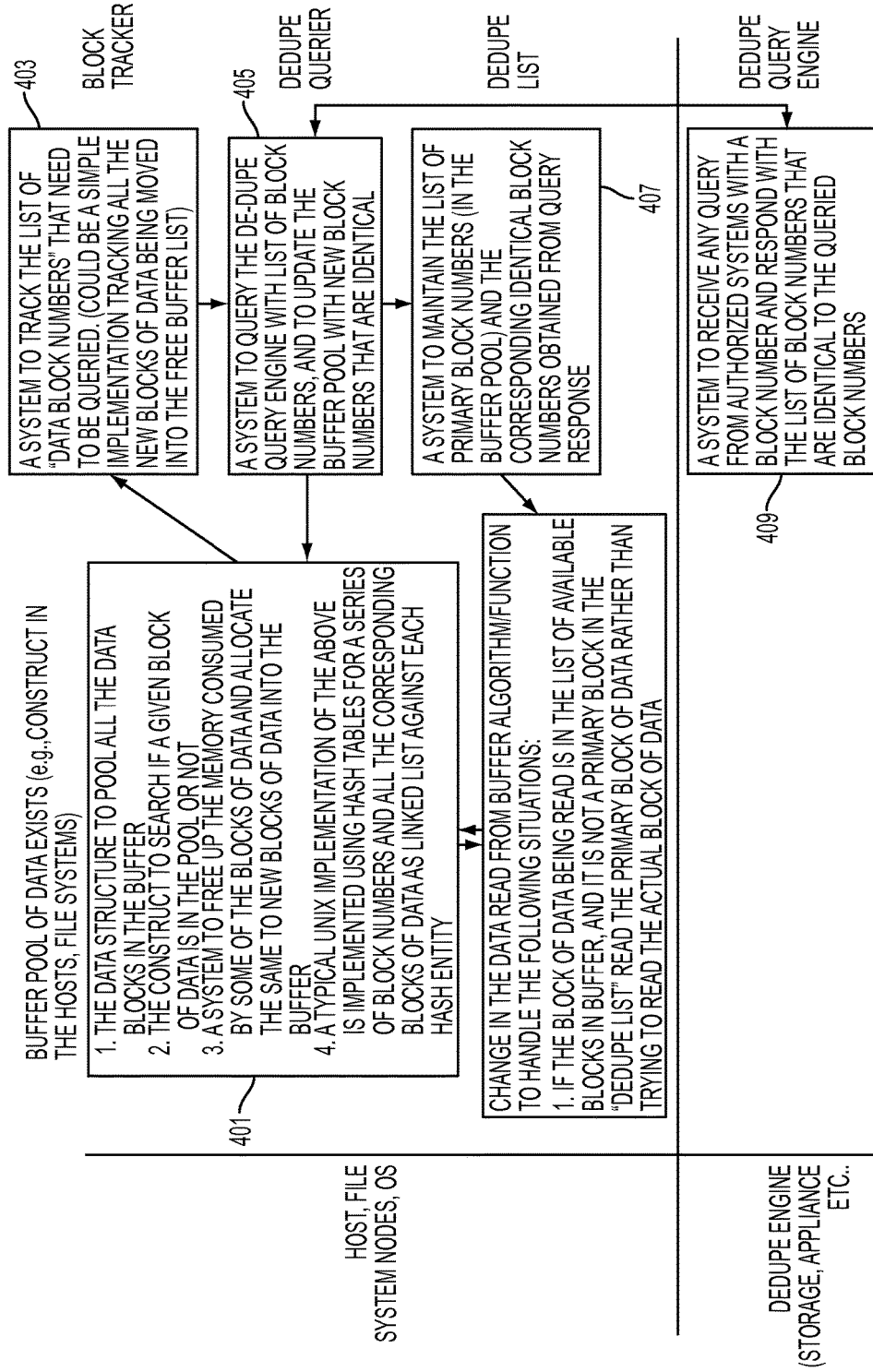
FIG. 4 depicts a block diagram of an implementation according to an embodiment of the present invention.

Referring now to FIG. 4, another example implementation according to an embodiment will be described. In this example implementation, a buffer pool of data 401 (corresponding, for example, to the pool 301 depicted in FIG. 3) includes: (1) The data structure to pool all the data blocks in the buffer; (2) The construct to search if a given block of data is in the pool or not; and (3) A system to free up the memory consumed by some of the blocks of data and allocate the same to new blocks of data into the buffer. In one example, a typical conventional Unix implementation of such a buffer pool of data is implemented using hash tables for a series of block numbers and all the corresponding blocks of data as a linked list against each hash entity (of note, the buffer pool 401 is of a conventional system type—the remaining elements of FIG. 4 are depicted as various embodiments of the invention).

Still referring to FIG. 4, it is seen that a block tracker 403 is also provided. This block tracker 403 is a mechanism (e.g., system) to track the list of "data block numbers" that need to be queried (in one example, this could be a simple implementation tracking all the new blocks of data being moved into the free buffer list).

Still referring to FIG. 4, it is seen that a de-dupe querier 405 is also provided. This de-dupe querier 405 is a mechanism (e.g., system) to query a de-dupe query engine with a list of block numbers, and to update the buffer pool of data 401 with new block numbers that are identical. As seen, the de-dupe querier 405 interfaces with de-dupe query engine 409 (e.g., a system to receive any query (from authorized systems) with one or more block numbers and respond with the list of block number(s) that are identical to the queried block number(s)).

Still referring to FIG. 4, it is seen that a de-dupe list 407 is also provided. This de-dupe list 407 is a mechanism (e.g., system) to maintain the list of primary block numbers (in the buffer pool) and the corresponding identical block numbers obtained from query response(s) (this is the function or algorithm that exists in a file system, host or operating system to read the data; this function or algorithm receives block read requests, searches the pool 401 and if the block number is found, it responds with the corresponding block of data). Further, the de-dupe list 407 interfaces with the buffer pool of data 401 to change the "data read from the buffer algorithm/function" to handle the following situation: if the block of data being read is in the list of available blocks in buffer, and it is not a primary block in the "dedupe list," read the primary block of data rather than trying to read the actual block of data.

Figure 5A:
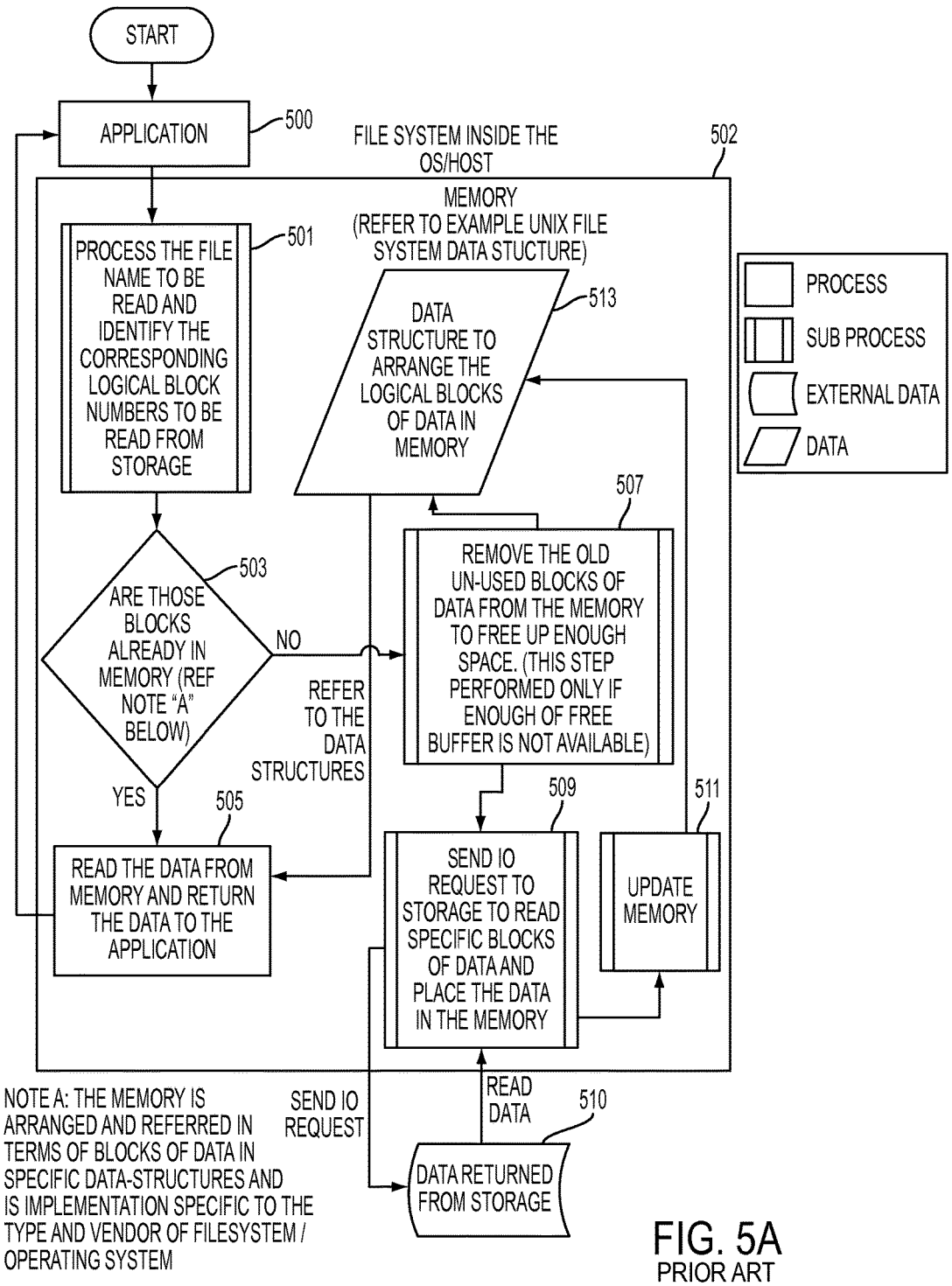
FIG. 5A depicts a block diagram of a conventional method and FIG. 5B depicts a block diagram of a method according to an embodiment of the present invention.
Figure 9:
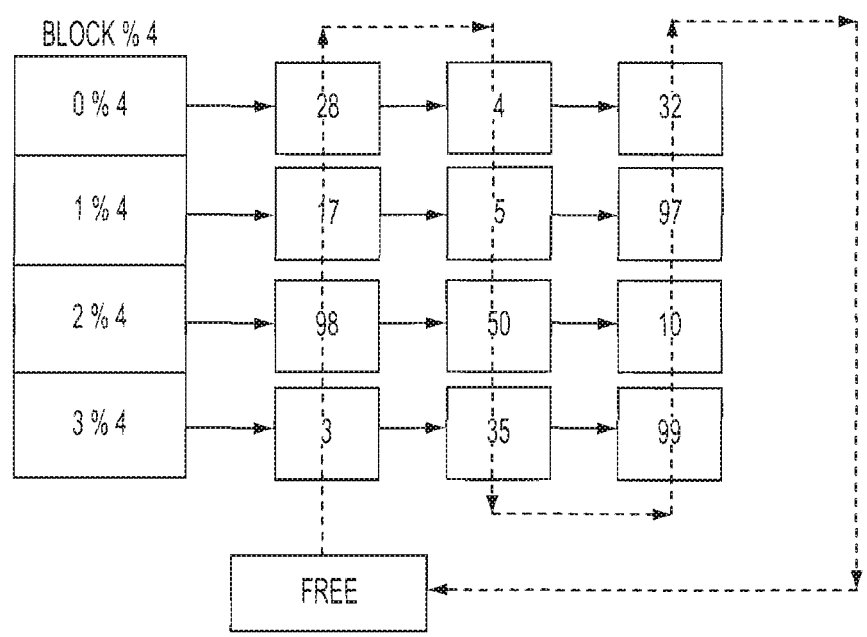
FIG. 9 depicts a block diagram of a conventional data structure example of a Unix file system and FIG. 10 depicts a block diagram of data structure example of a Unix file system according to an embodiment of the present invention.

Referring now to FIG. 5A, a conventional method will be described. In this method, the process starts with application 500 interfacing with file system 502 (e.g., inside the operating system (OS)/host). As seen, the process proceeds as follows: Step 501—process the file name to be read and identify the corresponding logical block numbers to be read from storage; Step 503—determine if those blocks are already in memory (note, the memory is arranged and referred to in terms of blocks of data in specific data structures and is implementation specific to the type and vendor of File system/Operating system); 505—if "yes" at 503, then read the data from memory and return the data to the application; Step 507—if "no" at 503, then at Step 507 remove the old unused blocks of data from the memory to free up enough space (this step performed only if enough of free buffer is not available); at Step 509—send I/O request to storage (see external data 510) to read specific blocks of data and place the data in the memory (see Step 511—update the memory and memory 513 (data structure to arrange the logical blocks of data in memory)). The data structure implementation is specific to the technology and vendor. An example of one specific implementation in Unix file system can be referred to in FIG. 9, which has hash table and linked list data structure implementation for arranging all the blocks of data in the memory.

Figure 5B:
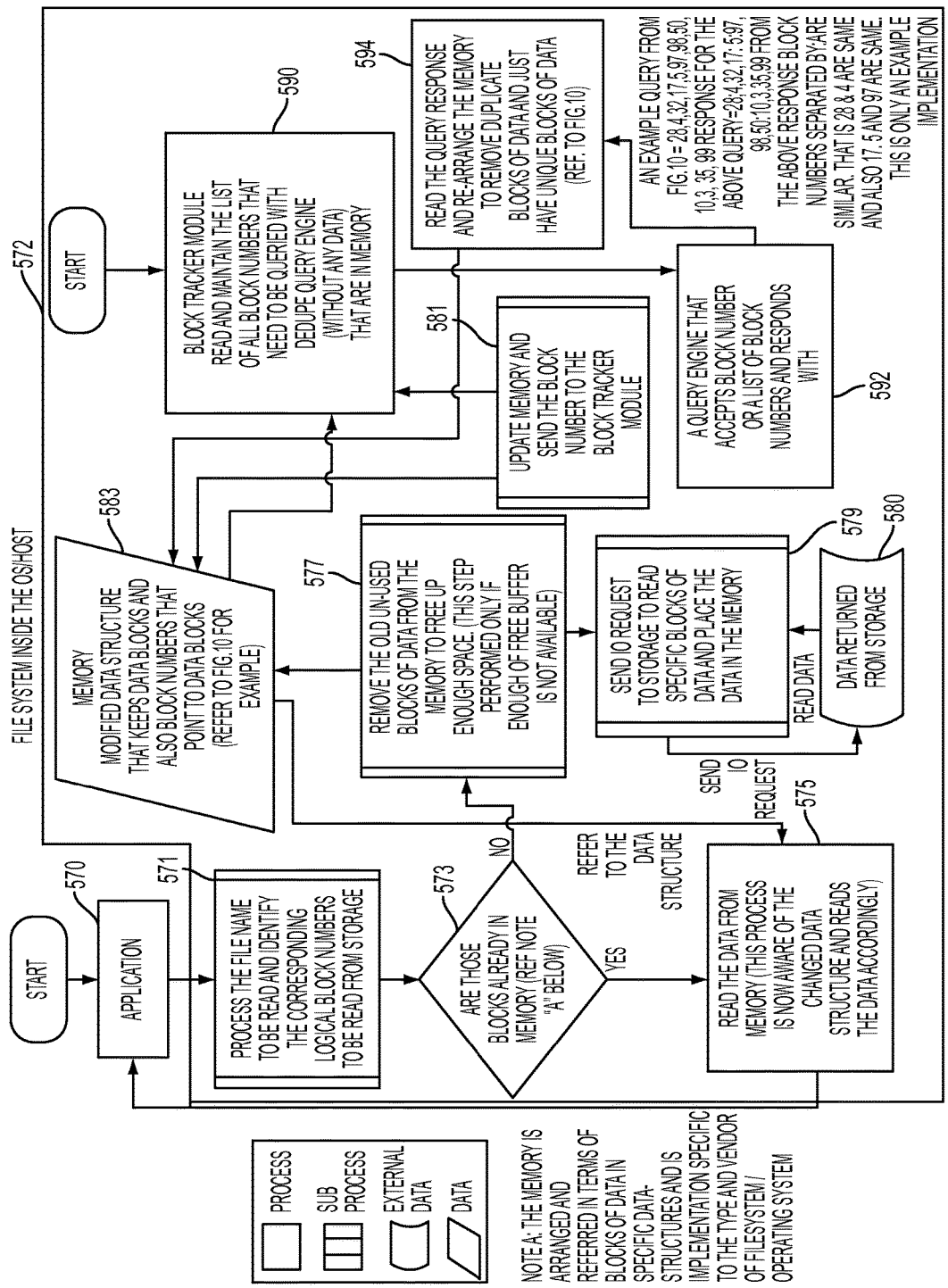
Figure 10:
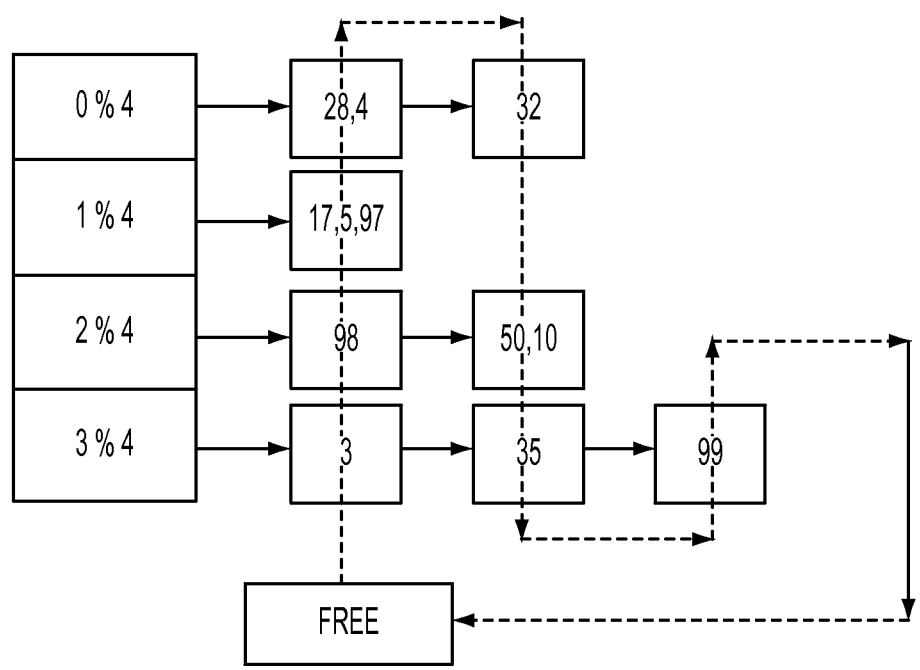

Referring now to FIG. 5B, an example implementation according to an embodiment will be described. In this example implementation, the process starts with application 570 interfacing with file system 572 (e.g., inside the operating system (OS)/host). As seen, the process proceeds as follows: Step 571—process the file name to be read and identify the corresponding logical block numbers to be read from storage; Step 573—determine if those blocks are already in memory (note, the memory is arranged in terms of blocks of data in specific data structures and this arrangement is specific to the type and vendor of File system/Operating system); 575—if "yes" at 573, then read the data from memory and then return the data to the application (note that this process must be modified compared to the conventional method since the data structure in memory would be modified which is described further below); Step 577—if "no" at 573, then at Step 577 remove the old unused blocks of data from the memory to free up enough space (this step performed only if enough of free buffer is not available); at Step 579—send I/O request to storage (see external storage 580) to read specific blocks of data and place the data in memory (see Step 581—update the memory and send the block number to the block tracker module 590; see also memory 583—which is a data structure that keeps data blocks. This data structure is modified compared to conventional method. An example is provided in FIG. 10, wherein a single block of data in memory now has the ability to point to multiple block numbers. In the example shown, block numbers 28 & 4 are stored as 1 block of data instead of storing them as 2 blocks since they are found to be similar in the steps described further).

Still referring to FIG. 5B, another process (which may run partially concurrently or fully concurrently with the process described above) is started and at step 590 reads and maintains the list of all the block numbers that need to be queried with de-dupe query engine (without any data) that are in memory. See also 592 which is a query engine that accepts a block number or a list of block numbers and responds with a response (in the example considered so far as in FIG. 10, an example query would be "28,4,32,17,5, 97,98,50,10,3,35,99" and the response for this query may be "28:4,32,17:5:97,98,50:10,3,35,99"—this example response means that block numbers separated by ":" are similar. That is, 28 & 4 are same and also 17, 5 and 97 are same and so on). See also 594, a step that reads the query response and re-arranges the memory with unique blocks of data and update the block numbers accordingly. This can be seen as in FIG. 10, which is the result of this step. It may be noticed that the result has fewer amount of memory that points to larger number of blocks of data.

Figure 6:
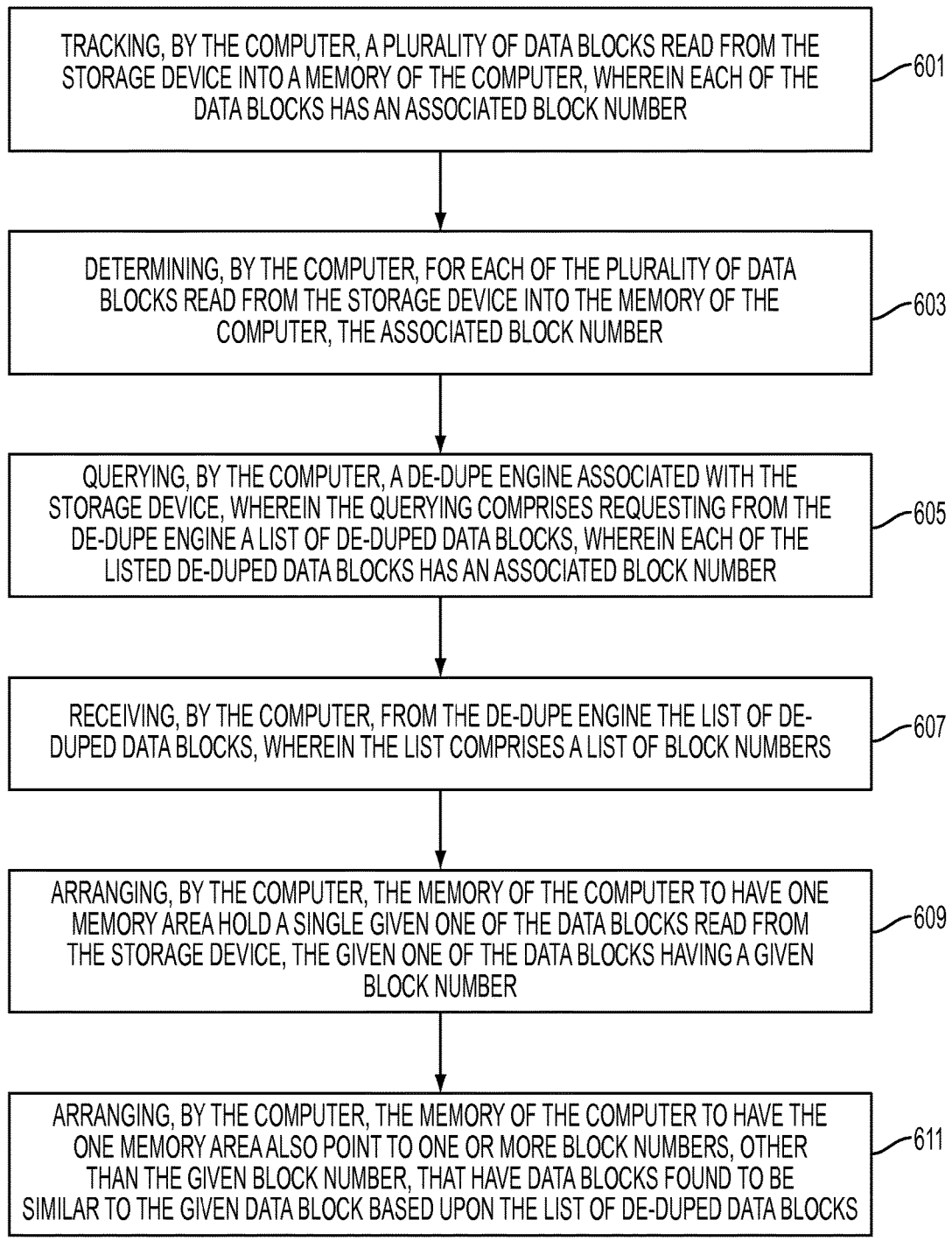
FIG. 6 depicts a block diagram of a method according to an embodiment of the present invention.

Referring now to FIG. 6, a method implemented in a computer for reducing input/output operations between the computer and a storage device accessible by the computer is shown. As seen in this FIG. 6, the method of this embodiment comprises: at 601—tracking, by the computer, a plurality of data blocks read from the storage device into a memory of the computer, wherein each of the data blocks has an associated block number; at 603—determining, by the computer, for each of the plurality of data blocks read from the storage device into the memory of the computer, the associated block number; at 605—querying, by the computer, a de-dupe engine associated with the storage device, wherein the querying comprises requesting from the de-dupe engine a list of de-duped data blocks, wherein each of the listed de-duped data blocks has an associated block number; at 607—receiving, by the computer, from the de-dupe engine the list of de-duped data blocks, wherein the list comprises a list of block numbers; at 609—arranging, by the computer, the memory of the computer to have one memory area hold a single given one of the data blocks read from the storage device, the given one of the data blocks having a given block number; and at 611—arranging, by the computer, the memory of the computer to have the one memory area also point to one or more block numbers, other than the given block number, that have data blocks found to be similar to the given data block based upon the list of de-duped data blocks.

In one example, any steps may be carried out in the order recited or the steps may be carried out in another order.

Figure 7:
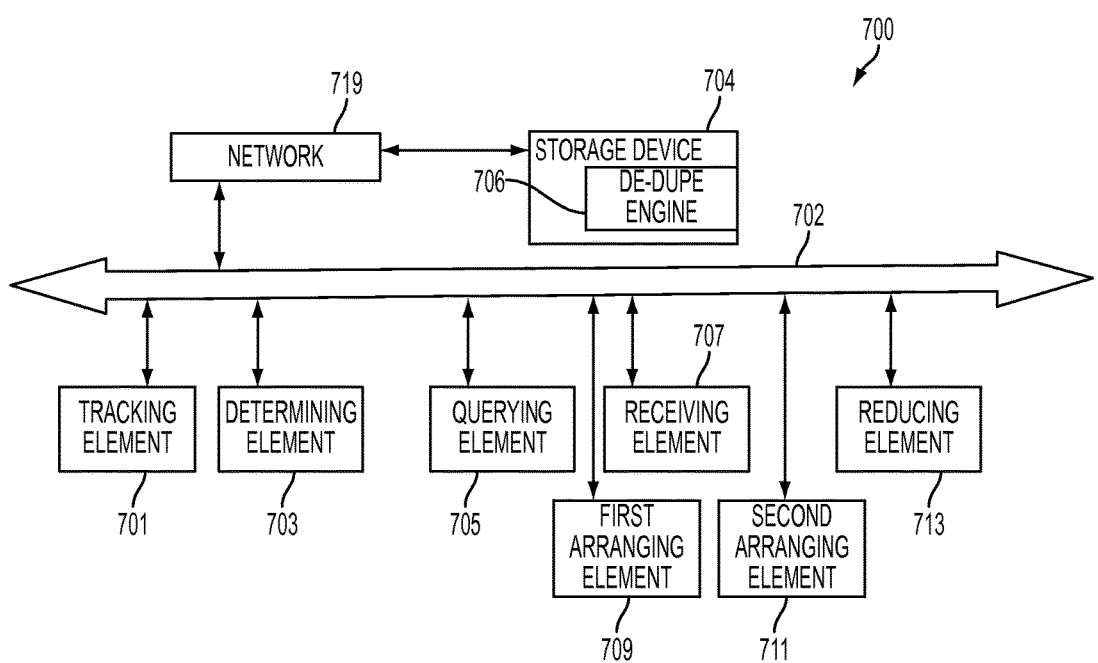
FIG. 7 depicts a block diagram of a system according to an embodiment of the present invention.

Referring now to FIG. 7, in another embodiment, a computer-implemented system 700 for reducing input/output operations between the computer and a storage device 704 accessible by the computer is provided. This system may include the following elements: a tracking element 701 configured to track a plurality of data blocks read from the storage device into a memory of the computer, wherein each of the data blocks has an associated block number; a determining element 703 configured to determine, for each of the plurality of data blocks read from the storage device into the memory of the computer, the associated block number; a querying element 705 configured to query a de-dupe engine 706 associated with the storage device, wherein the querying comprises requesting from the de-dupe engine a list of de-duped data blocks, wherein each of the listed de-duped data blocks has an associated block number; a receiving element 707 configured to receive from the de-dupe engine the list of de-duped data blocks, wherein the list comprises a list of block numbers; a first arranging element 709 configured to arrange the memory of the computer to have one memory area hold a single given one of the data blocks read from the storage device, the given one of the data blocks having a given block number; and a second arranging element 711 configured to arrange the memory of the computer to have the one memory area also point to one or more block numbers, other than the given block number, that have data blocks found to be similar to the given data block based upon the list of de-duped data blocks. In on specific example, the system may further comprise a reducing element 713 configured to reduce the amount of memory required by reducing the data blocks held in the memory to only unique blocks of data.

Still referring to FIG. 7, each of the elements may be operatively connected together via system bus 702. In one example, communication between and among the various elements may be bi-directional. In another example, communication (e.g., with the storage device/de-dupe engine) may be carried out via network 719 (e.g., the Internet, an intranet, a local area network, a wide area network and/or any other desired communication channel(s)). In another example, some or all of these elements may be implemented in a computer system of the type shown in FIG. 8.

Figure 8:
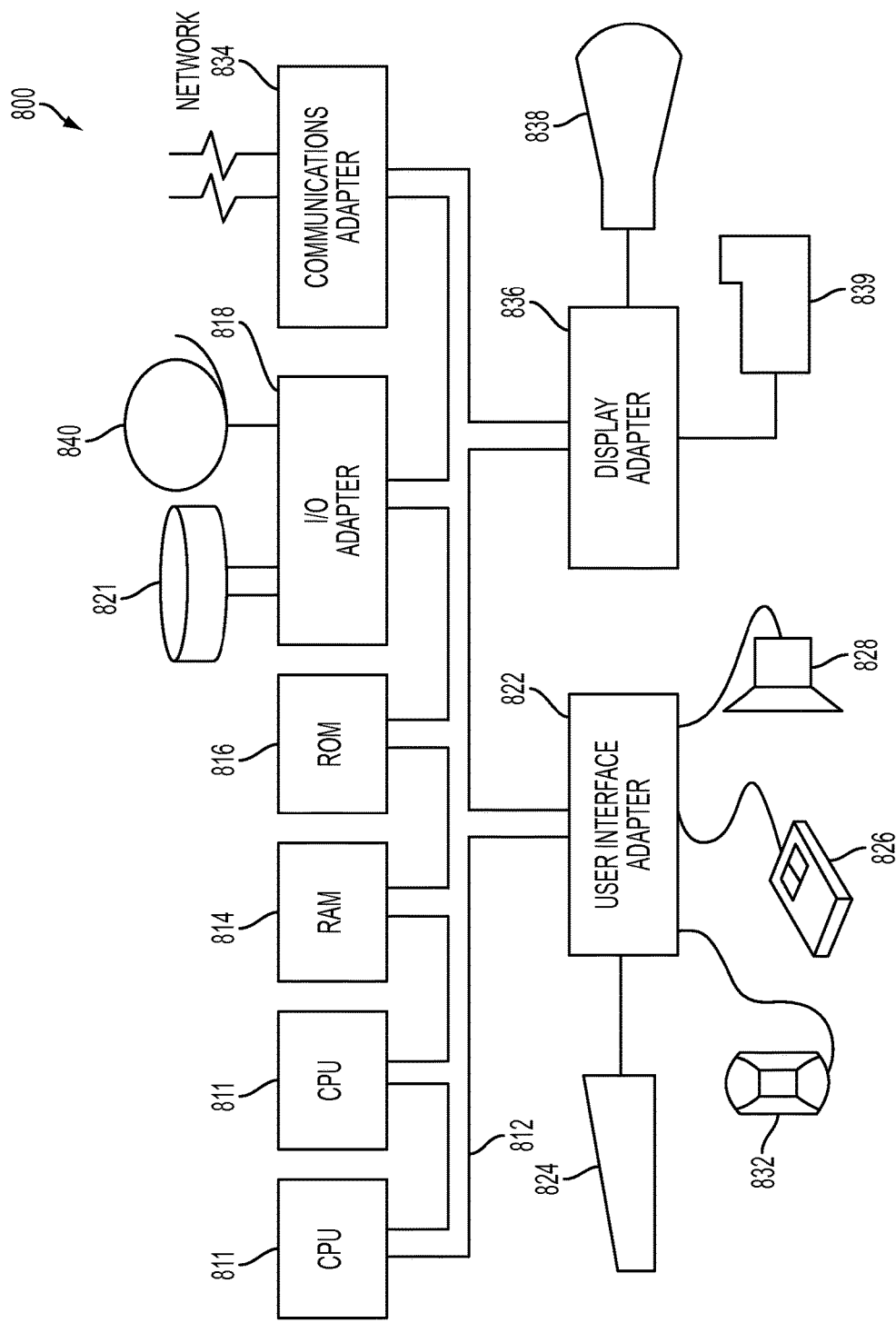
FIG. 8 depicts a block diagram of a system according to an embodiment of the present invention.

Referring now to FIG. 8, this figure shows a hardware configuration of computing system 800 according to an embodiment of the present invention. As seen, this hardware configuration has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communications adapter 834 for connecting the system 800 to a data processing network, the Internet, an Intranet, a local area network (LAN), etc., and a display adapter 836 for connecting the bus 812 to a display device 838 and/or printer 839 (e.g., a digital printer or the like).

In one embodiment, a method implemented in a computer for reducing input/output operations between the computer and a storage device accessible by the computer is provided, the method comprising: tracking, by the computer, a plurality of data blocks read from the storage device into a memory of the computer, wherein each of the data blocks has an associated block number; determining, by the computer, for each of the plurality of data blocks read from the storage device into the memory of the computer, the associated block number; querying, by the computer, a de-dupe engine associated with the storage device, wherein the querying comprises requesting from the de-dupe engine a list of de-duped data blocks, wherein each of the listed de-duped data blocks has an associated block number; receiving, by the computer, from the de-dupe engine the list of de-duped data blocks, wherein the list comprises a list of block numbers; arranging, by the computer, the memory of the computer to have one memory area hold a single given one of the data blocks read from the storage device, the given one of the data blocks having a given block number; and arranging, by the computer, the memory of the computer to have the one memory area also point to one or more block numbers, other than the given block number, that have data blocks found to be identical to the given data block based upon the list of de-duped data blocks.

In one example, the arranging, by the computer, the memory of the computer to have one memory area hold a single given one of the data blocks read from the storage device further comprises: arranging, by the computer, the memory of the computer to have a plurality of memory areas each holding a single given one of the data blocks read from the storage device.

In another example, the arranging, by the computer, the memory of the computer to have the one memory area also point to one or more block numbers further comprises: arranging, by the computer, the memory of the computer to have each of the memory areas also point to one or more block numbers, other than the given block number for the respective memory area.

In another example, the memory is arranged to have the one memory area point to a plurality of block numbers, other than the given block number.

In another example, the computer is a virtual computer.

In another example, the method further comprises reducing, by the computer, the amount of memory required by reducing the data blocks held in the memory to only unique blocks of data.

In another example, the computer comprises one or more servers or virtual servers.

In another example, the memory of the computer comprises one or more of: (a) a buffer memory; (b) a cache memory; or (c) any combination thereof.

In another example, the storage device comprises one or more of: (a) a hard drive; (b) a solid-state memory; or (c) any combination thereof.

In another example, the method further comprises: searching the memory, by the computer, for a block of data that points to a unique data which in turn points to a plurality of other identical blocks of data, thereby increasing input/output referenceability without adding the data.

In another example, the method integrates into an existing file system process.

In another embodiment, a computer-implemented system for reducing input/output operations between the computer and a storage device accessible by the computer is provided, the system comprising: a tracking element configured to track a plurality of data blocks read from the storage device into a memory of the computer, wherein each of the data blocks has an associated block number; a determining element configured to determine, for each of the plurality of data blocks read from the storage device into the memory of the computer, the associated block number; a querying element configured to query a de-dupe engine associated with the storage device, wherein the querying comprises requesting from the de-dupe engine a list of de-duped data blocks, wherein each of the listed de-duped data blocks has an associated block number; a receiving element configured to receive from the de-dupe engine the list of de-duped data blocks, wherein the list comprises a list of block numbers; a first arranging element configured to arrange the memory of the computer to have one memory area hold a single given one of the data blocks read from the storage device, the given one of the data blocks having a given block number; and a second arranging element configured to arrange the memory of the computer to have the one memory area also point to one or more block numbers, other than the given block number, that have data blocks found to be similar to the given data block based upon the list of de-duped data blocks.

In one example, the arranging the memory of the computer to have one memory area hold a single given one of the data blocks read from the storage device further comprises: arranging the memory of the computer to have a plurality of memory areas each holding a single given one of the data blocks read from the storage device.

In another example, the arranging the memory of the computer to have the one memory area also point to one or more block numbers further comprises: arranging the memory of the computer to have each of the memory areas also point to one or more block numbers, other than the given block number for the respective memory area.

In another example, the memory is arranged to have the one memory area point to a plurality of block numbers, other than the given block number.

In another example, the computer is a virtual computer.

In another example, the system further comprises a reducing element configured to reduce the amount of memory required by reducing the data blocks held in the memory to only unique blocks of data.

In another example, the computer comprises one or more servers or virtual servers.

In another example, the memory of the computer comprises one or more of: (a) a buffer memory; (b) a cache memory; or (c) any combination thereof.

In another example, the storage device comprises one or more of: (a) a hard drive; (b) a solid-state memory; or (c) any combination thereof.

In another example, the system further comprises: a searching element configured to search the memory for a block of data that points to a unique data which in turn points to a plurality of other identical blocks of data, thereby increasing input/output referenceability without adding the data.

In another example, the system integrates into an existing file system structure.

In another embodiment, a computer readable storage medium, tangibly embodying a program of instructions executable by the computer for reducing input/output operations between the computer and a storage device accessible by the computer is provided, the program of instructions, when executing, performing the following steps: tracking a plurality of data blocks read from the storage device into a memory of the computer, wherein each of the data blocks has an associated block number; determining, for each of the plurality of data blocks read from the storage device into the memory of the computer, the associated block number; querying a de-dupe engine associated with the storage device, wherein the querying comprises requesting from the de-dupe engine a list of de-duped data blocks, wherein each of the listed de-duped data blocks has an associated block number; receiving from the de-dupe engine the list of de-duped data blocks, wherein the list comprises a list of block numbers; arranging the memory of the computer to have one memory area hold a single given one of the data blocks read from the storage device, the given one of the data blocks having a given block number; and arranging the memory of the computer to have the one memory area also point to one or more block numbers, other than the given block number, that have data blocks found to be similar to the given data block based upon the list of de-duped data blocks.

In other examples, any steps described herein may be carried out in any appropriate desired order.

As described herein, conventional de-dupe technology reduces the storage foot print by removing all identical blocks and having unique blocks of data only but the technology does not reduce the number of IO operations required by a server with the operating system/file system/database (or any software that manages the data blocks stored on the disk subsystem). Thus, various embodiments reduce the IO operations associated with a storage subsystem in a de-duped system. In particular, reducing the IO operations results in one or more of: (a) reduction of load on the CPU; (b) significant increase in performance of the applications (since the IO operations will be served from memory rather than the storage subsystem—thus reducing the latency); (c) reduction of load on the storage subsystem; and/or (d) reduction of load on the storage network.

As described herein, mechanisms are provided to integrate into an existing file system/process. The mechanisms may track data blocks read from a storage device into a server's memory and read all the block numbers. Queries may be made to a de-dupe engine to identify a list of de-duped blocks. In one specific example, mechanisms may be provided to re-arrange memory and/or one or more data structures (which had previously been arranged in the form of 1 memory area to hold 1 block of data) to 1 memory area holding 1 block of data and also pointing to many other block numbers which have been found to be similar by de-duped storage—thus helping reduce the IOs from the server to the storage device. In another specific example, the data blocks in memory are reduced to only hold the unique blocks of data—thereby reducing the memory required. In another specific example, a storage device that has de-dupe capabilities is able to receive queries with a list of block numbers and respond with a de-dupe list: for each data block number this storage device receives as input (called a primary block number), the storage device responds with the list of all the block that are similar to the primary block number. In another specific example, mechanisms are provided to modify an existing system (that previously looked for a logical block of data in memory) to look for a block of data that could be pointing to a unique data so as to increase the IO referenceability—without adding the data.

As described herein, various embodiments may operate in the context of: computer memory (storage) resource management (e.g., in the context of cache memory).

As described herein, various embodiments provide for reducing overall I/O operations during access of de-duped data blocks. In one specific example, mechanisms are provided for querying a de-dupe engine to identify a list of de-duped blocks, wherein the corresponding memory/data structure (e.g., of a server buffer) is re-arranged to store one memory area storing one memory data block and pointing to many other data blocks thereby storing only the unique data blocks for reducing the required memory size. Such data blocks may be similar to de-duped storage and may reduce I/O operations to the storage device. The de-dupe device may respond to the query with the list of block numbers along with the arrangement. Further, mechanisms are provided for modifying the system to look for logical block of data in the memory that stores data blocks pointing to a unique data in order to increase I/O referenceability without adding the data. In one specific example, deduplication information may be stored at a system-wide level and a deduplication index and chunks may be stored locally in order to enable faster retrieval and restore.

As described herein, various embodiments may provide for maintaining a list for mapping virtual addresses to de-duplicated data stored in a server cache.

As described herein, various embodiments may provide benefits including (but not limited to) the following: (a) increases data buffer size by a factor almost equal to the de-dupe factor (e.g., 1:2 to 1:25 depending on the data type) with a very small over head; (b) reduces by a significant amount the input/output since many inputs/outputs would be served instead from the buffer; (c) does not induce any significant performance over head since the process can be run out of band at any time without affecting the normal flow of the input/output processing; (d) increases the performance of the external storage device since many of the inputs/outputs would be served from the server buffer.

As described herein, various embodiments provide for the exchange of de-dupe information (e.g., indexes, meta data) from the storage device (e.g., system/appliances) to one or more servers (or hosts). In various specific examples, this information exchange may be carried out through the use of: (a) one or more application programming interfaces (APIs)—for example, via the use of published APIs; (b) one or more web services; or (c) any combination thereof.

As described herein, various embodiments provide for one or more servers (or hosts) connected to a storage device which is functioning as a de-dupe system to significantly reduce the input/output (TO) operations from the server(s) to the storage device (this in turn results in lower CPU utilization).

As described herein, various embodiments provide for reducing cache memory utilization on the server(s) or host(s) (see, e.g., FIG. 3) without carrying out computationally expensive compression and/or other techniques.

As described herein, various embodiments provide for one or more backup servers (or hosts) connected to a de-dupe system (storage device or appliance) so that the backup server(s) or hosts(s) can improve the restore time.

As described herein, in another example, changes may be made to a conventional file system block read function to have a memory location point to more than one block number.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer for reducing input/output operations between the computer and a storage device accessible by the computer, the method comprising:
   tracking, by the computer, a list of block numbers associated with a plurality of disk blocks being moved from the storage device into a memory of the computer;
   arranging, by the computer, the plurality of disk blocks in the memory in a data structure including a set of primary disk blocks associated with a list of primary block numbers;
   sending, by the computer, a query to a deduplication engine of the storage device, wherein the query includes a request for a list of deduplicated disk blocks;
   receiving, by the computer, from the deduplication engine of the storage device, the list of deduplicated disk blocks with a list of corresponding block numbers, wherein the received list of deduplicated disk blocks includes indications of similarities among the list of deduplicated disk blocks;
   identifying, by the computer and based on the indications of similarities in the received list, a set of disk blocks among the deduplicated disk blocks that are similar to the plurality of disk blocks in the memory;
   rearranging, by the computer, the primary disk blocks in the data structure in order to update the list of primary block numbers to point to a plurality of block numbers associated with the identified set of disk blocks among the list of deduplicated disk blocks;
   in response to a request to access a particular disk block, identifying, by the computer, a particular primary disk block number of a particular primary disk block in the rearranged data structure; and
   reading, by the computer, the particular primary disk block from the memory instead of reading the requested particular disk block from the storage device.

2. The method of claim 1, further comprising arranging, by the computer, the memory of the computer to have one memory area hold a single given one of the disk blocks read from the storage device, and arranging, by the computer, the memory of the computer to have a plurality of memory areas each holding the single given one of the disk blocks read from the storage device.

3. The method of claim 2, wherein the single given one of the disk blocks has a given block number; and wherein the method further comprises arranging, by the computer, the memory of the computer to have each of the memory areas also point to one or more block numbers, other than the given block number for the respective memory area.

4. The method of claim 3, wherein the memory is arranged to have the one memory area point to a plurality of block numbers, other than the given block number.

5. The method of claim 1, wherein the computer is a virtual computer.

6. The method of claim 1, further comprising reducing, by the computer, the amount of memory required by reducing the disk blocks held in the memory to only unique blocks of data.

7. The method of claim 1, wherein the computer comprises one or more servers or virtual servers.

8. The method of claim 1, wherein the memory of the computer comprises a buffer memory.

9. The method of claim 1, wherein the storage device comprises a solid-state memory.

10. The method of claim 1, further comprising:
    searching the memory, by the computer, for a block of data that points to a unique data which in turn points to a plurality of other identical blocks of data, thereby increasing input/output referenceability without adding the data.

11. An apparatus for reducing input/output operations between a computer and a storage device accessible by the computer, the apparatus comprising a processor and a memory coupled to the processor, wherein the memory comprises instructions which, when executed by the processor, cause the processor to perform:
    tracking a list of block numbers associated with a plurality of disk blocks being moved from the storage device into the memory;
    arranging the plurality of disk blocks in the memory in a data structure including a set of primary disk blocks associated with a list of primary block numbers;
    sending a query to a deduplication engine of the storage device, wherein the query includes a request for a list of deduplicated disk blocks;
    receiving from the deduplication engine of the storage device, the list of deduplicated disk blocks with a list of corresponding block numbers, wherein the received list of deduplicated disk blocks includes indications of similarities among the list of deduplicated disk blocks;

identifying, based on the indications of similarities in the received list, a set of disk blocks among the deduplicated disk blocks that are similar to the plurality of disk blocks in the memory rearranging the primary disk blocks in the data structure in order to update the list of primary block numbers to point to a plurality of block numbers associated with the identified set of disk blocks among the list of deduplicated disk blocks;

in response to a request to access a particular disk block, identify a particular primary disk block number of a particular primary disk block in the rearranged data structure; and read the particular primary disk block from the memory instead of reading the requested particular disk block from the storage device.

12. The apparatus of claim 11, further configured for arranging the memory to have one memory area hold a single given one of the disk blocks read from the storage device, and further configured for arranging the memory to have a plurality of memory areas each holding the single given one of the disk blocks read from the storage device.

13. The apparatus of claim 12, wherein the single given one of the disk blocks has a given block number; and wherein the integrating of the method into the existing file system further comprises arranging the memory to have each of the memory areas also point to one or more block numbers, other than the given block number for the respective memory area.

14. The apparatus of claim 13, wherein the memory is arranged to have the one memory area point to a plurality of block numbers, other than the given block number.

15. The apparatus of claim 11, wherein the computer is a virtual computer.

16. The apparatus of claim 11, further comprising a reducing element configured to reduce the amount of memory required by reducing the disk blocks held in the memory to only unique blocks of data.

17. The apparatus of claim 11, wherein the computer comprises one or more servers or virtual servers.

18. The apparatus of claim 11, wherein the memory comprises one or more of: (a) a buffer memory; (b) a cache memory; or (c) any combination thereof.

19. The apparatus of claim 11, wherein the storage device comprises a solid-state memory.

20. The apparatus of claim 11, further comprising:
a searching element configured to search the memory for a block of data that points to a unique data which in turn points to a plurality of other identical blocks of data, thereby increasing input/output referenceability without adding the data.

21. A non-transitory computer readable storage medium, tangibly embodying a program of instructions executable by the computer for reducing input/output operations between the computer and a storage device accessible by the computer, the program of instructions, when executing, performing the following steps:

tracking a list of block numbers associated with a plurality of disk blocks being moved from the storage device into a memory of the computer;

arranging the plurality of disk blocks in the memory in a data structure including a set of primary disk blocks associated with a list of primary block numbers;

sending a query to a deduplication engine of the storage device, wherein the query includes a request for a list of deduplicated disk blocks;

receiving, from the deduplication engine of the storage device, the list of deduplicated disk blocks with a list of corresponding block numbers, wherein the received list of deduplicated disk blocks includes indications of similarities among the list of deduplicated disk blocks;

identifying, based on the indications of similarities in the received list, a set of disk blocks among the deduplicated disk blocks that are similar to the plurality of disk blocks in the memory;

rearranging the primary disk blocks in the data structure in order to update the list of primary block numbers to point to a plurality of block numbers among the list of deduplicated disk blocks;

in response to a request to access a particular disk block, identifying a particular primary disk block number of a particular primary disk block in the rearranged data structure; and reading the particular primary disk block from the memory instead of reading the requested particular disk block from the storage device.

* * * * *